United States Patent
Yang

(10) Patent No.: US 11,457,272 B2
(45) Date of Patent: Sep. 27, 2022

(54) VIDEO PROCESSING METHOD, ELECTRONIC DEVICE, AND COMPUTER-READABLE MEDIUM

(71) Applicant: GUANGDONG OPPO MOBILE TELECOMMUNICATIONS CORP., LTD., Dongguan (CN)

(72) Inventor: Hai Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/331,480

(22) Filed: May 26, 2021

(65) Prior Publication Data

US 2021/0289259 A1    Sep. 16, 2021

Related U.S. Application Data

(63) Continuation of application No. PCT/CN2019/110000, filed on Oct. 8, 2019.

(30) Foreign Application Priority Data

Nov. 27, 2018    (CN) .......................... 201811428013.3

(51) Int. Cl.
*H04N 21/4402*    (2011.01)
*H04N 21/426*    (2011.01)
*H04N 21/458*    (2011.01)

(52) U.S. Cl.
CPC ............... *H04N 21/440263* (2013.01); *H04N 21/42607* (2013.01); *H04N 21/42653* (2013.01); *H04N 21/440218* (2013.01); *H04N 21/458* (2013.01)

(58) Field of Classification Search
CPC ....... H04N 21/25858; H04N 21/42607; H04N 21/42653; H04N 21/4312; H04N 21/4341;
(Continued)

(56) References Cited

U.S. PATENT DOCUMENTS 8,175,298 B2 *    5/2012    Mitani ..................... H04N 5/60
381/74
8,201,211 B2 *    6/2012    Proust ................ H04N 21/4432
707/999.203

(Continued)

FOREIGN PATENT DOCUMENTS

CN    101904174 A    12/2010
CN    102438230 A    5/2012
(Continued)

OTHER PUBLICATIONS

The first Office Action dated Nov. 28, 2019 from from China Application No. 201811428013.3.
(Continued)

*Primary Examiner* — Michael B. Pierorazio
(74) *Attorney, Agent, or Firm* — Bayes PLLC

(57) ABSTRACT

The present disclosure relates to the technical field of video processing, and disclosed therein are a video processing method, electronic device, and computer-readable medium. The method includes acquiring a video type of a video file scheduled for playing; determining whether the video type is a specified type; and if the video type is a specified type, controlling a graphics processor to process the video file scheduled for playing and then display same on a screen.

18 Claims, 6 Drawing Sheets

(58) Field of Classification Search
CPC ......... H04N 21/44004; H04N 21/4402; H04N 21/440218; H04N 21/440263; H04N 21/442; H04N 21/44204; H04N 21/44222; H04N 21/4424; H04N 21/458
See application file for complete search history.

(56) References Cited

U.S. PATENT DOCUMENTS

| | | | |
|---|---|---|---|
| 8,238,726 B2 * | 8/2012 | Takatsuji | H04N 21/2368 386/338 |
| 8,351,624 B2 * | 1/2013 | Motomura | H04N 21/43635 348/706 |
| 8,451,375 B2 * | 5/2013 | Ejima | H04N 5/04 348/515 |
| 8,479,253 B2 * | 7/2013 | Glen | H04N 7/163 725/98 |
| 8,692,937 B2 * | 4/2014 | Altmann | H04N 5/04 348/588 |
| 8,922,713 B1 * | 12/2014 | Chakrovorthy | H04N 5/04 348/515 |
| 9,247,289 B2 * | 1/2016 | Ichimura | H04N 5/04 |
| 9,509,887 B2 * | 11/2016 | Leyendecker | H04N 21/4122 |
| 9,626,308 B2 * | 4/2017 | Colenbrander | G06F 3/1423 |
| 10,142,521 B2 * | 11/2018 | Winsvold | H04N 21/43072 |
| 2006/0140265 A1 * | 6/2006 | Igler | H04N 7/163 386/E9.017 |
| 2006/0149850 A1 * | 7/2006 | Bowman | G11B 27/10 709/205 |
| 2006/0242314 A1 * | 10/2006 | Logvinov | H04N 21/43615 709/231 |
| 2007/0046835 A1 * | 3/2007 | Kim | H04N 21/42204 348/731 |
| 2007/0157234 A1 * | 7/2007 | Walker | H04N 21/4621 725/38 |
| 2008/0063216 A1 * | 3/2008 | Sakata | H04S 3/008 381/80 |
| 2008/0309830 A1 * | 12/2008 | Motomura | H04N 21/43635 348/E5.122 |
| 2008/0320545 A1 * | 12/2008 | Schwartz | H04N 21/8541 725/135 |
| 2009/0091655 A1 * | 4/2009 | Russell | H04N 21/43072 348/E5.009 |
| 2009/0147849 A1 | 6/2009 | Au et al. | |
| 2010/0125657 A1 | 5/2010 | Dowling et al. | |
| 2010/0315553 A1 * | 12/2010 | Takatsuji | G09G 5/006 348/E9.034 |
| 2010/0321479 A1 * | 12/2010 | Yang | H04N 21/816 348/51 |
| 2011/0051002 A1 * | 3/2011 | Oh | H04N 5/765 348/569 |
| 2011/0068736 A1 * | 3/2011 | Chartier | H02J 7/00 320/137 |
| 2011/0134338 A1 * | 6/2011 | Toba | H04N 5/765 348/734 |
| 2011/0142245 A1 * | 6/2011 | Toba | H04N 21/436 381/22 |
| 2011/0176057 A1 * | 7/2011 | Okamura | H04N 21/439 348/554 |
| 2011/0234916 A1 * | 9/2011 | Fujita | H04N 5/60 348/E5.122 |
| 2012/0002562 A1 * | 1/2012 | Kawade | H04N 5/765 370/252 |
| 2012/0042346 A1 * | 2/2012 | Yoshida | H04N 21/4363 725/81 |
| 2012/0087415 A1 | 4/2012 | Rabii | |
| 2012/0133829 A1 * | 5/2012 | Nakade | H04N 21/43635 348/E9.034 |
| 2012/0136612 A1 * | 5/2012 | Vanderhoff | H04N 17/004 702/119 |
| 2012/0188456 A1 * | 7/2012 | Kuroyanagi | H04N 5/765 348/731 |
| 2013/0021536 A1 * | 1/2013 | Kamida | H04N 21/43622 348/739 |
| 2013/0051578 A1 * | 2/2013 | Chu | H04B 15/00 381/94.1 |
| 2013/0051584 A1 * | 2/2013 | Higuchi | H04N 21/8106 381/123 |
| 2013/0201397 A1 * | 8/2013 | Ayoub | H04R 5/04 381/74 |
| 2014/0035938 A1 | 2/2014 | Wang | |
| 2014/0193134 A1 * | 7/2014 | Maeda | H04N 21/43072 386/231 |
| 2015/0074729 A1 * | 3/2015 | Kim | H04N 21/44227 725/80 |
| 2015/0077633 A1 * | 3/2015 | Lee | H04N 21/4392 348/515 |
| 2015/0237441 A1 * | 8/2015 | Muramatsu | H04R 3/00 381/120 |
| 2017/0094342 A1 * | 3/2017 | Lugtenberg | H04N 21/42653 |
| 2017/0244927 A1 * | 8/2017 | Kim | H04N 5/775 |
| 2017/0317835 A1 * | 11/2017 | Nishio | H04L 9/3263 |
| 2017/0371564 A1 | 12/2017 | Hou et al. | |
| 2018/0262731 A1 * | 9/2018 | Oh | H04N 9/641 |
| 2018/0278811 A1 * | 9/2018 | Winsvold | H04N 21/4392 |
| 2019/0028691 A1 * | 1/2019 | Hinds | H04N 21/4518 |

FOREIGN PATENT DOCUMENTS

| | | |
|---|---|---|
| CN | 103841389 A | 6/2014 |
| CN | 104796768 A | 7/2015 |
| CN | 104866381 A | 8/2015 |
| CN | 105916023 A | 8/2016 |
| CN | 106407009 A | 2/2017 |
| CN | 107483725 A | 12/2017 |
| CN | 108600813 A | 9/2018 |
| CN | 109587546 A | 4/2019 |

OTHER PUBLICATIONS

The Second Office Action dated Mar. 16, 2020 from from China Application No. 201811428013.3.
Notice of Allowance dated Jul. 14, 2020 from from China Application No. 201811428013.3.
International Search Report and the Written Opinion dated Dec. 27, 2019 From the International Searching Authority Re. Application No. PCT/CN2019/110000.
Supplementary European Search Report, dated Nov. 23, 2021 from EP Application No. 19891124.0., 15 pages.

* cited by examiner

VIDEO PROCESSING METHOD, ELECTRONIC DEVICE, AND COMPUTER-READABLE MEDIUM

CROSS-REFERENCE TO RELATED APPLICATIONS

This application is a continuation application of International Application No. PCT/CN2019/110000, filed on Oct. 8, 2019, which claims the priority to a Chinese Application No. 201811428013.3, filed on Nov. 27, 2018, the entire contents of which are incorporated herein by reference.

BACKGROUND

The present disclosure relates to the field of image processing, and more specifically, to a video processing method, apparatus, electronic device, and computer-readable medium.

With the development of electronic technology and information technology, more and more devices can play video. In a process of video playback, the device needs to perform operations such as decoding, rendering, and compositing on the video, and then display the video on the screen. However, in the existing video playback technology, although a graphics processing unit can reduce the pressure of loading of a central processing unit, a lot of memory is occupied. Therefore, it is very important to choose a reasonable processor to process the video.

SUMMARY

In view of the above problem, the present disclosure proposes a video processing method, apparatus, electronic device, and computer-readable medium to improve the above defects.

In a first aspect, an embodiment of the present disclosure provides a video processing method for an electronic device, the electronic device including a central processing unit, a screen and a graphics processing unit, the method executed by the central processing unit including acquiring a video type of a video file scheduled for playing; determining whether the video type is consistent with a specified type; controlling, in response to the video type consistent with the specified type, the graphics processing unit to process the video file scheduled for playing and to display the video file scheduled for playing on the screen.

In a second aspect, an embodiment of the present disclosure provides an electronic device, includes a central processing unit and a graphics processing unit; a memory; a screen; one or more applications stored in the memory and configured to be executed by the central processing unit, wherein the one or more applications are configured to execute the above-mentioned method.

In a three aspect, an embodiment of the present disclosure provides a computer-readable storage medium characterized in that the computer-readable storage medium is provided with program codes stored thereon, wherein the program codes can be called by a processor to execute the above-mentioned method.

BRIEF DESCRIPTION OF THE DRAWINGS

To illustrate technical solutions of embodiments of the present disclosure more clearly, the drawings that need to be used in the description of the embodiments will be briefly introduced as follows. Obviously, the drawings are merely some embodiments of the present disclosure, and those skilled in the art may also obtain other drawings based on these accompanying drawings without creative efforts.

DETAILED DESCRIPTION

To enable that those skilled in the art better understand the technical solutions of the present disclosure, the technical solutions of the present disclosure will be described clearly and completely in conjunction with the accompanying drawings in the embodiments of the present disclosure.

Figure 1:
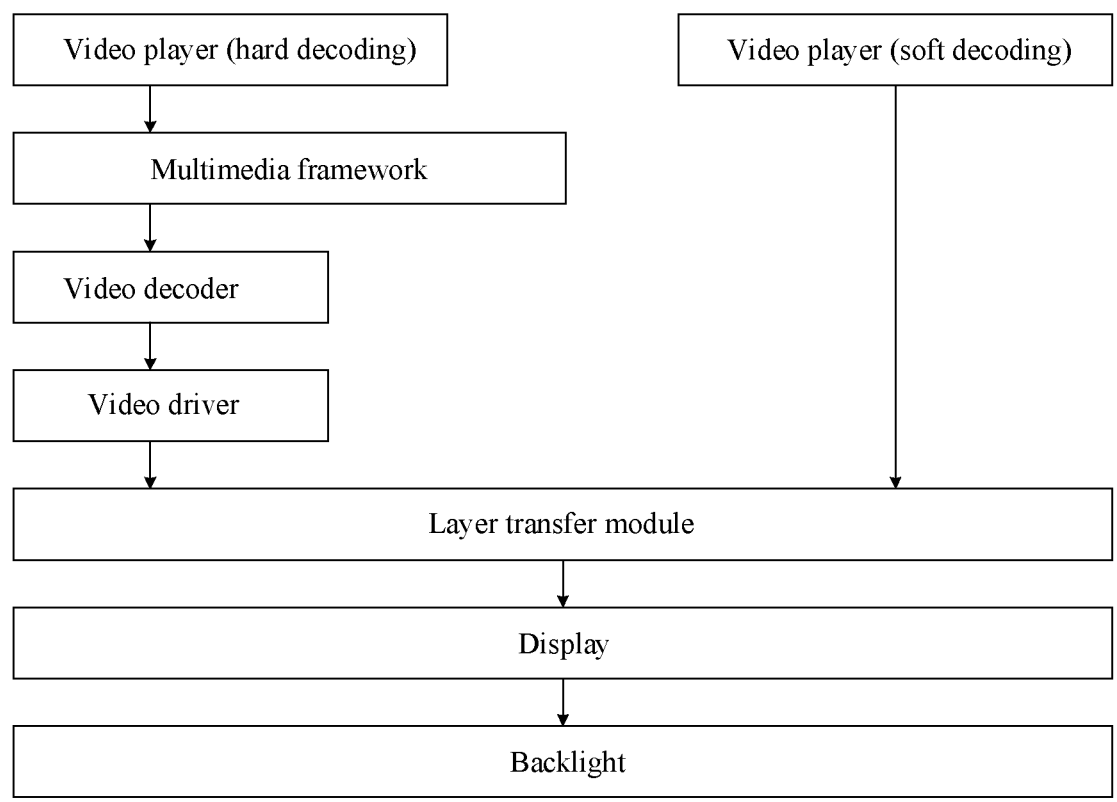
FIG. 1 is a block diagram illustrating a video playback architecture provided by an embodiment of the present disclosure.

Please refer to FIG. 1, which shows a block diagram of a video playback architecture. Specifically, when an operating system acquires data to be played, the next job is to parse the data for audio and video. General video files are composed of two parts: video streams and audio streams. The audio and video in different video formats have different packaging formats. The process of synthesizing an audio stream and a video stream is called a muxer. On the contrary, the process of separating the audio stream and the video stream is called a demuxer. It is desired to play a video file requires to separate the audio stream and the video stream from a file stream and then respectively decode them. Decoded video frames can be directly rendered, and audio frames can be sent to a buffer of an audio output device for playback. Certainly, timestamps of the video rendering and the audio playback must be synchronized.

Specifically, video decoding can include hard decoding and soft decoding. Hardware decoding is to hand over a part of video data that was originally processed by a central processing unit (CPU) to a graphics processing unit (GPU). The parallel computing power of the GPU is much higher than that of the CPU, so that load of the CPU can be reduced. After occupancy rate of the CPU is lower, some other programs can be run at the same time. Certainly, for better processors, such as i5 2320 or any quad-core processor from AMD, hardware and software solutions can be selected on demand.

Specifically, as shown in FIG. 1, a multimedia framework acquires a video file to be played on a client via an application-programming interface (API) with the client and submits the video file to a video decoder. The multimedia framework (i.e., a media framework) is a multimedia framework in an Android system. Three parts, such as a MediaPlayer, a MediaPlayerService, and a Stagefrightplayer, constitute a basic multimedia framework of the Android system. a part of the multimedia framework adopts a C/S architecture, in which the MediaPlayer serves as a client of the C/S architecture, and the MediaPlayerService and the Stagefrightplayer serve as a server of the C/S architecture, which is responsible for playing multimedia files. The server completes the request from the client and responds by the Stagefrightplayer. "Video Docode" is a super-decoder that integrates functions for decoding and playing the most commonly used audio and video and is used to decode video data.

Soft decoding is that the CPU is used to decode the video by software, and then the GPU is called to render and synthesize the video after decoding to display the video on the screen. Hard decoding refers to that a video decoding task is independently completed by dedicated daughter card equipment without the help from the CPU.

Regardless of hard decoding or soft decoding, after the video is decoded, the decoded video data will be sent to a layer transfer module (such as a SurfaceFlinger). The decoded video data will be rendered and synthesized by the SurfaceFlinger and then displayed on the screen. In addition, the SurfaceFlinger is an independent service that receives surfaces of all windows as an input and calculates one position of each surface in a final synthesized image according to parameters, such as ZOrder, transparency, size, and location. Then, the position of each surface in the final synthesized image will be submitted to a HWComposer or an OpenGL to generate a final display buffer and then be displayed on a specific display device.

As shown in FIG. 1, in a soft decoding process, the CPU decodes the video data and delivers the decoded video data to the SurfaceFlinger for rendering and synthesis, and in a hard decoding process, the GPU decodes the video data and delivers the decoded video data to the SurfaceFlinger for rendering and synthesis. The SurfaceFlinger will call the GPU to achieve image rendering and synthesis for displaying on a display screen.

Figure 2:
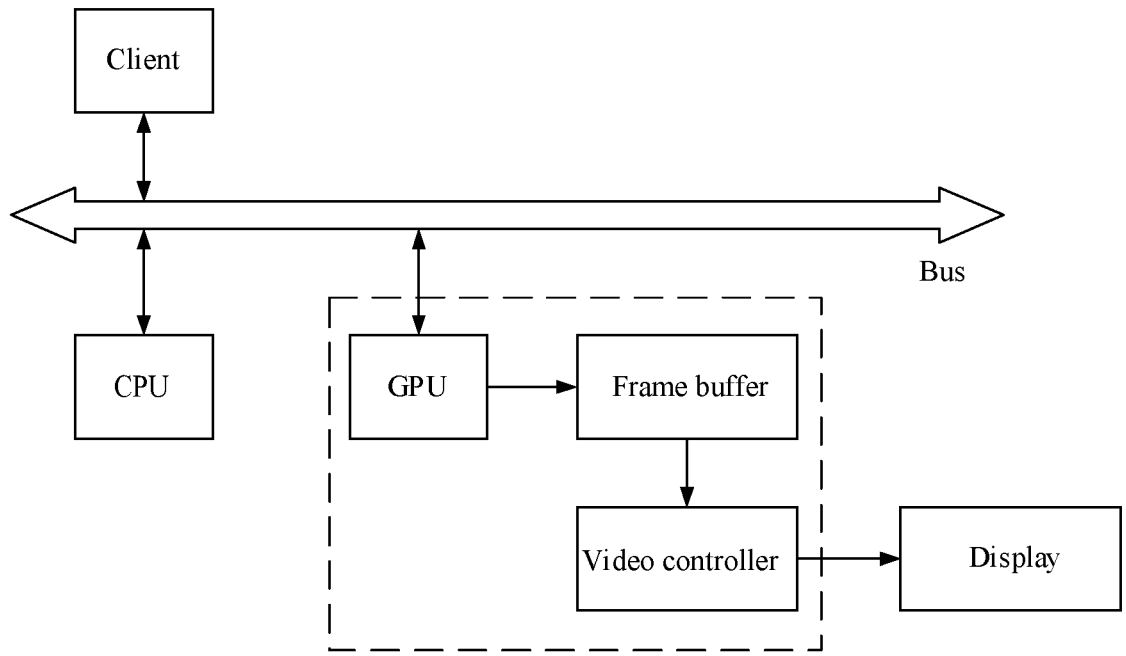
FIG. 2 is a block diagram illustrating an image rendering architecture provided by an embodiment of the present disclosure.

As an implementation, a process of image rendering is shown in FIG. 2, the CPU acquires a video file scheduled for playing sent by the client. After the video file scheduled for playing is decoded, the CPU obtains the decoded video data and sends the video data to the GPU. After rendering is completed by the GPU. A rendering result will be put into a frame buffer (such as a frame buffer shown in FIG. 2). Then, a video controller will read the data in the frame buffer line by line according to a signal of HSync, and deliver the data to a display after digital-to-analog conversion.

When an electronic device acquires the video file scheduled for playing, specifically, the CPU acquires the video file scheduled for playing, the CPU can be used to decode the video file scheduled for playing, and then send decoded data to the SurfaceFlinger for rendering and synthesis and then for display. Alternatively, the CPU can send the video file scheduled for playing to the GPU. After the video file scheduled for playing is decoded by an image processing circuit of the GPU, it is sent to the SurfaceFlinger for rendering and synthesis and then for display. Currently, a CPU rendering mode is generally adopted by default. However, because the CPU also needs to process a lot of other operations, the CPU that is used for video rendering will invisibly cause unnecessary waste of resources of the electronic device. If a GPU rendering mode is adopted by default, although the GPU that is used to process images can alleviate the load pressure of the CPU, the GPU occupies a lot of memory, which causes that the choice between an image processor and the central processing unit to process video files is unreasonable.

Figure 3:
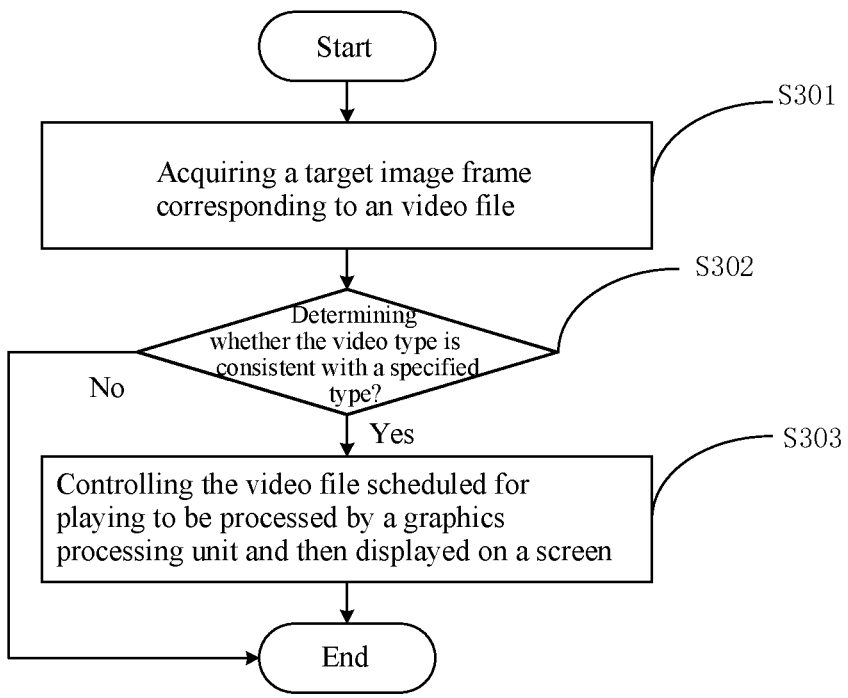
FIG. 3 is a method flowchart illustrating a video processing method provided by an embodiment of the present disclosure.

Hence, in order to solve the above technical defects, as shown in FIG. 3, an embodiment of the present disclosure provides a video processing method, which is applied to an electronic device including a central processing unit, a screen, and a graphics processing unit, wherein the method includes S301 to S303.

S301: acquiring a video type of a video file scheduled for playing.

Specifically, when a client of the electronic device wants to play the video, the electronic device can acquire the video file scheduled for playing, and then decode the video file. Specifically, the above-mentioned soft decoding or hard decoding can be used to decode the video file. After decoding, data of image frames to be rendered and corresponding to the video file can be acquired, and it can be displayed on the display screen after the image frames are rendered.

Specifically, the electronic device includes a central processing unit and a graphics processing unit. A specific embodiment of acquiring data of image frames to be rendered and corresponding to the video file is that the central processing unit acquires the video file scheduled for playing sent by the client. As an embodiment, the central processing unit acquires a video playback request sent by the client, wherein the video playback request includes the video file scheduled for playing. Specifically, the video playback request can include identity information of the video file scheduled for playing, wherein the identity information can be a title of the video file. Based on the identity information of the video file, the video file can be found in a storing space where the video file is stored.

As an implementation, when the client plays the video, a video playback module in the electronic device will be called to parse and decode the video file scheduled for playing. The client has an icon on a desktop of a system. A user can click the icon of the client to open the client. For example, a package name of an application clicked by the user can be confirmed. A package name of a video application can be obtained from codes in the background of the system. A format of the package name is "com.android.video."

There is a display content corresponding to videos displayed on an interface of a video list of the client. The content corresponding to videos includes thumbnails corresponding to each video. Each thumbnail can be used as a touch button. If the user clicks the thumbnail, the client can detect the thumbnail which the user wants to click. It is also possible to determine which video file scheduled for playing is to be played.

The client can respond to the video file selected by the user in the video list, a playback interface after playing the video file, and a playback button after clicking the playback interface. By monitoring touch operations to the user, the client can detect what type of video file that the user is currently clicking on. Specifically, the playback button is set with a preset attribute. By detecting the attribute of the playback button corresponding to the acquired touch operation, the video file scheduled for playing selected by the user can be determined.

For example, the client is a video-chatting client. After a video-chatting button is clicked, a generated video file is the video file scheduled for playing that includes video data generated during voice chat. For another example, each video in a video category interface of the client corresponds to a video file to be played.

The central processing unit detects a current video playback request, which may be generated when the user triggers the playback button corresponding to the video file and provided by the above-mentioned client. After the video file scheduled for playing is acquired, determine the video type of the video file scheduled for playing.

The video type may be a format of a video file, such as mpg, mpeg, dat, mp4, 3gp, mov, rm, ram, rmvb, and wmv. In addition, the video type can also be distinguished according to whether the video file is a video played online. For example, the video type can be divided into online video and offline video. The online video is the video played online by the client, and the offline video is a video file played by the client and stored locally on the electronic device. In addition, the video type can also be distinguished according to resolution of the video, such as standard-definition, ultra-definition, and high-definition. For example, the type of the video file with a physical resolution below 1280P*720P is standard-definition.

S302: determining whether the video type is consistent with a specified type.

The specified type is a preset video type of the video file processed by the graphics processor. The standards for setting the video type of the video file scheduled for playing are different, and standards for determining whether the video type is the specified type are also different.

As an implementation, the video type of the video file scheduled for playing may be a format of the video file scheduled for playing. The specified type can be a specified video file format. For example, it can be MP4, etc. If the video type of the video file scheduled for playing is MP4 format, determine that the video type is the specified type, else, determine that the video type is not the specified type.

As another implementation, the video type of the video file scheduled for playing can be standard-definition, ultra-definition, or high-definition, which are divided according to the video resolution. The specified type can be specified resolution. For example, it can be ultra-definition. If the video type of the video file scheduled for playing is ultra-definition, it is determined that the video type is the specified type, else, it is determined that the video type is not the specified type.

As yet another implementation, the video type of the video file scheduled for playing can be an online video or an offline video. The specified type can be the online video. If the video type of the video file scheduled for playing is the online video, it is determined that the video type is the specified type, else, it is determined that the video type is not the specified type.

S303: controlling the video file scheduled for playing to be processed by the graphic processing unit and then displayed on the screen.

If the video type of the video file scheduled for playing is consistent with the specified type, controlling the video file scheduled for playing to be processed by the graphics processing unit and then displayed on the screen. If the resolution of the video file scheduled for playing is not consistent with the specified resolution, controlling the video file scheduled for playing to be processed by the graphics processing unit and then displayed on the screen, or controlling the video file scheduled for playing to be processed by the central processing unit and then displayed on the screen. In other words, the central processing unit can be used to decode the video file scheduled for playing, or the graphics processing unit can be used to decode the video file scheduled for playing.

If the video type of the video file scheduled for playing is the specified type, controlling the video file scheduled for playing to be processed by the graphics processing unit and then displayed on the screen, and calling the graphics processing unit to decode the video file scheduled for playing. Specifically, the central processing unit sends the video file scheduled for playing to the graphics processing unit. After the graphics processing unit acquires the video file scheduled for playing, the graphics processing unit decodes, renders, and synthesizes the video file scheduled for playing to be then displayed on the screen.

As an implementation, the graphics processing unit decodes the video file scheduled for playing, thereby acquiring data of image frames corresponding to the video file scheduled for playing. Specifically, the central processing unit calls a playback module to parse the video file scheduled for playing, thereby acquiring video stream and audio stream corresponding to the video file scheduled for playing. The playback module can be a MediaExtractor module in an Android system or an FFmpeg module. The FFmpeg module is an open-sourced cross-platform video and audio streaming framework, that belongs to free software and uses LGPL or GPL licenses (depending on selected components) It provides a complete solution for recording, converting and streaming audio and video. It contains a rich audio/video codec library, libavcodec.

Then, the central processing unit sends the video stream to the graphics processing unit. After the graphics processing unit decodes the video stream, it obtains the data of image frames corresponding to the video stream and then synthesizes the data of image frames. Specifically, a synthesis method can be synthesized in the frame buffer shown in FIG. 2. Namely, the data of image frames can be rendered and synthesized in a manner of on-screen rendering or off-screen rendering.

As an implementation, an off-screen rendering buffer is configured in the GPU in advance. Specifically, the GPU will call a rendering client module to render and synthesize the data of image frames to be rendered and send it to the display screen for display. Specifically, the rendering client module may be an OpenGL module. The final position of an OpenGL rendering pipeline is in the frame buffer. The frame buffer is a series of two-dimensional pixel storage arrays, including a color buffer, a depth buffer, a stencil buffer, and an accumulation buffer. By default, OpenGL uses the frame buffer provided by a windows system.

OpenGL's GL_ARB_framebuffer_object extension provides a way to create an extra frame buffer object (FBO). Using the frame buffer object, OpenGL can redirect the frame buffer originally drawn to the window into the FBO.

Thus, a buffer outside the frame buffer is configured by the FBO, that is, the off-screen rendering buffer. Then, the acquired data of image frames is stored in the off-screen rendering buffer. Specifically, the off-screen rendering buffer may be a storing space corresponding to the graphics processing unit, that is, the off-screen rendering buffer itself has no space for storing images, but after mapping with the storing space in the graphics processing unit, the image is actually stored in a storing space in the graphics processing unit corresponding to the off-screen rendering buffer.

By binding the data of image frames to the off-screen rendering buffer, the data of image frames can be stored in the off-screen rendering buffer, that is, the data of image frames can be found in the off-screen rendering buffer.

After storing the data of image frames in the off-screen rendering buffer, the data of image frames can be rendered in the off-screen rendering buffer. Specifically, the data of image frames can be processed for display enhancement. For example, image parameter optimization of the data of image frames in the off-screen rendering buffer can be performed, wherein the image parameter optimization includes at least one of exposure enhancement, denoising, edge sharpening, contrast increase, or saturation increase.

Then, the data of image frames can be sent to the frame buffer corresponding to the screen, where the frame buffer corresponds to the screen and is used to store the data that needs to be displayed on the screen, such as the frame buffer shown in FIG. 2. A Framebuffer is in a driver interface in an operating system kernel. The Android system is taken as an example. Linux operates in a protected mode, such that a user process cannot use an interruption call provided in a BIOS of a graphics card to directly write data displayed on the screen, like a DOS system. Linux abstracts the Framebuffer to be used by the user process to directly write data displayed on the screen. The Framebuffer mechanism imitates functions of the graphics card, and a video memory can be operated directly by reading and writing the Framebuffer. Specifically, the Framebuffer can be regarded as mapping of a display memory. After it is mapped to a process address space, read and write operations can be performed directly, and the written data can be displayed on the screen.

The frame buffer can be regarded as a space for storing data. The CPU or GPU puts the data to be displayed into the frame buffer. The Framebuffer itself does not have any ability of data computing. A video controller reads the data in the Framebuffer to be displayed on the screen according to a screen refresh rate.

The data of image frames is read from the frame buffer and then displayed on the screen. Specifically, after the data of image frames is stored in the frame buffer, after the graphics processing unit detects the data written in the frame buffer, the optimized data of image frames is read from the frame buffer and then displayed on the screen.

As an implementation, the data of image frames is read from the frame buffer by the graphics processing unit in a frame by frame manner according to a refresh frequency of the screen and then displayed on the screen after rendering and synthesis processing.

Figure 4:
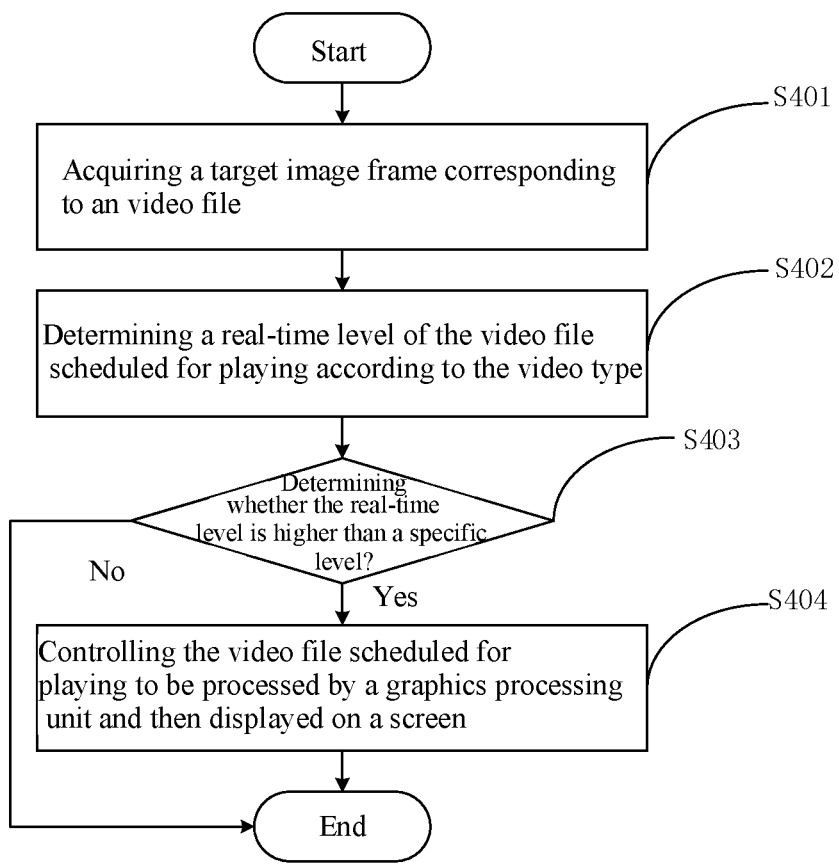
FIG. 4 is a method flowchart illustrating a video processing method provided by another embodiment of the present disclosure.

In addition, considering that the graphics processing unit's ability to process images is more preferable, and the processing speed is faster, and the computing power is stronger, for some video files that are highly used in real-time, such as online videos or real-time chat videos of video chat software, a graphics processing unit can be used for processing. Specifically, please refer to FIG. 4, another embodiment of the present disclosure provides a video processing method applied to an electronic device. The electronic device also includes a central processing unit, a screen, and a graphics processing unit. In an embodiment of the present disclosure, the central processing unit is served as a main execution entity. Furthermore, the method includes S401 to S404.

S401: acquiring a video type of a video file scheduled for playing.

S402: determining a real-time level of the video file scheduled for playing according to the video type.

As an implementation, the video type of the video file scheduled for playing includes online video and offline video. The real-time level of the online video is set to level 1, and the real-time level of the offline video is set to level 2, where, level 1 is higher than level 2.

Certainly, the video type can also correspond to a type of an application. For example, if applications include video software, social software, and game software, the video types can also include video software, social software, and game software. In addition, a specific implementation for determining the real-time level of the video file scheduled for playing according to the video type is to determine the real-time level of the video file scheduled for playing according to a category of the application, the application corresponding to the video file scheduled for playing. Specifically, an identifier of the application corresponding to the video file scheduled for playing is determined. In addition, the real-time level of the video file scheduled for playing is determined according to the identifier of the application. Specifically, an identifier of a target application that sends the playback request for the video file scheduled for playing is determined. In addition, the type of application corresponding to the identifier of the target application is determined.

After the identifier of the target application is acquired, the type of the target application is determined according to the identifier, wherein the identifier of the target application may be a package name or a title of the application, and the like. For example, a corresponding relationship between the identifier of the application and the category of the application is pre-stored in the electronic device.

For example, in an embodiment of the present disclosure, a game scene of the game software includes images and music. The music may be game music and game sound. For example, the game sound may be gunshots or footsteps. As an embodiment, audio data may be the game sound, and the application corresponding to the game sound is a certain game application (APP), and the category belongs to a game type. In addition, the video type of the video data scheduled for playing is determined according to the type of the application. Specifically, the type of the application can be used as the video type of the video data scheduled for playing. For example, if the type of the application is a game, the video type of the video data scheduled for playing is also a game.

The category of the above application can be the category set for the application by the developer of the application during the development, or the category set by the user for the application after the application is installed on the electronic device. For example, the user installs a certain application on the electronic device, after the installation is completed and the application is entered, a dialog box will be displayed to instruct the user to set a category for the application. The user can set the application belonging to a specific category according to requirements. For example, the user can set social software as an audio category, a video category, or a social category.

If the functions of some applications are diversified, the category of the application needs to be determined according to a specific operation behavior of the application. For example, if some applications can play videos and audios, such as some video playback software, which can play pure audio files or videos, the category of the application can be determined according to a usage record of the application. That is, according to the usage record of the application during a certain period, it is determined whether the user prefers to play video or to play audio more when using the application.

Specifically, acquiring operation-behavioral data of all users of the application within a preset period, wherein all users refer to all users who have installed the application, and the operation-behavioral data can be acquired from a server corresponding to the application. In other words, when the user uses the application, the user will use a user account corresponding to the user to log in to the application, and the operation-behavioral data corresponding to the user account will be sent to the server corresponding to the application, and the server will store the operation-behavioral data corresponding to the user account. In some embodiments, the electronic device sends an operation-behavioral query request for the application to the server corresponding to the application, and the server sends the operation-behavioral data of all users during a certain preset period to the electronic device.

The operation-behavioral data includes the title and time of the played audio file and the title and time of the played video file. By analyzing the operation-behavioral data, it can determine a quantity of the audio files and total playing time of the audio files played by the application and a quantity of the video files and total playing time of the video files played by the application, within the preset period. The category of the application is determined according to a proportion of the total playing time of audio files and video files within the preset period. Specifically, the proportion of the total playing time of the audio file and the video file within the preset period is acquired. For the convenience of description, the proportion of the total playing time of audio files within the preset period is recorded as a proportion of audio playback, and the proportion of the total playing time of video files within the preset period is recorded as a proportion of video playback. If the proportion of video playback is greater than the proportion of audio playback, the category of the application is set to a video type. If the proportion of audio playback is greater than the proportion of video playback, the category of the application is set to an audio type. For example, if the preset period is 30 days, i.e., 720 hours, and the total playback time of audio files is 200 hours, the proportion of audio playback is 27.8%, and the total playback time of video files is 330 hours, the proportion of video playback is 45.8%, the proportion of video playback is greater than the proportion of audio playback, then the category of the application is set to the video type.

Then, the real-time level corresponding to the video data scheduled for playing is determined according to the type of the application. Specifically, the real-time level corresponding to the type of application is stored in the electronic device, as shown in the following table.

| Identifier of application | Category of application | Real-time level |
| --- | --- | --- |
| Apk1 | Game | J1 |
| Apk2 | Video | J2 |
| Apk3 | Audio | J3 |
| Apk4 | Social | J1 |

Thus, the real-time level corresponding to the video file scheduled for playing can be determined.

S403: determining whether the real-time level is higher than a specified level.

It is determined that the video type is the specified type, if the real-time level is higher than the specified level. It is determined that the video type is not the specified type, if the real-time level is less than or equal to the specified level.

For different acquisition methods of the real-time level of the video file scheduled for playing, implementation methods for determining whether the real-time level is higher than the specified level are also different.

As an implementation, after the real-time level of the video file scheduled for playing is acquired, determining whether the real-time level is higher than the specified level. Determining whether the real-time level of the video file scheduled for playing is higher than the specified level. The specified level is a preset real-time level corresponding to the type that needs to reduce a delay of audio playback. The specified level can be set by the user according to requirements. For example, a preset level is J2 and above. If the real-time level of the video file scheduled for playing is J1, the real-time level of the video file scheduled for playing is higher than the specified level. The level of J1 is higher than that of J2, that is, in the above table 1, if the number following by J is smaller, then its level is higher.

As another implementation, the video type of the video file scheduled for playing includes online video and offline video. The real-time level of the online video is set to level 1, and the real-time level of the offline video is set to level 2, wherein level 1 is higher than level 2. The specified level can be level 2, wherein the level higher than level 2 is level 1. Namely, if the video file scheduled for playing is an online video, it is determined that the real-time level is higher than the specified level, else, it is determined that the real-time level is lower than or equal to the specified level.

S404: controlling the video file scheduled for playing to be processed by the graphics processing unit and then displayed on the screen.

It should be noted that, for a part that is not described in detail in the above-mentioned procedures, the above-mentioned embodiments can be used as a reference and are not described here again.

Figure 5:
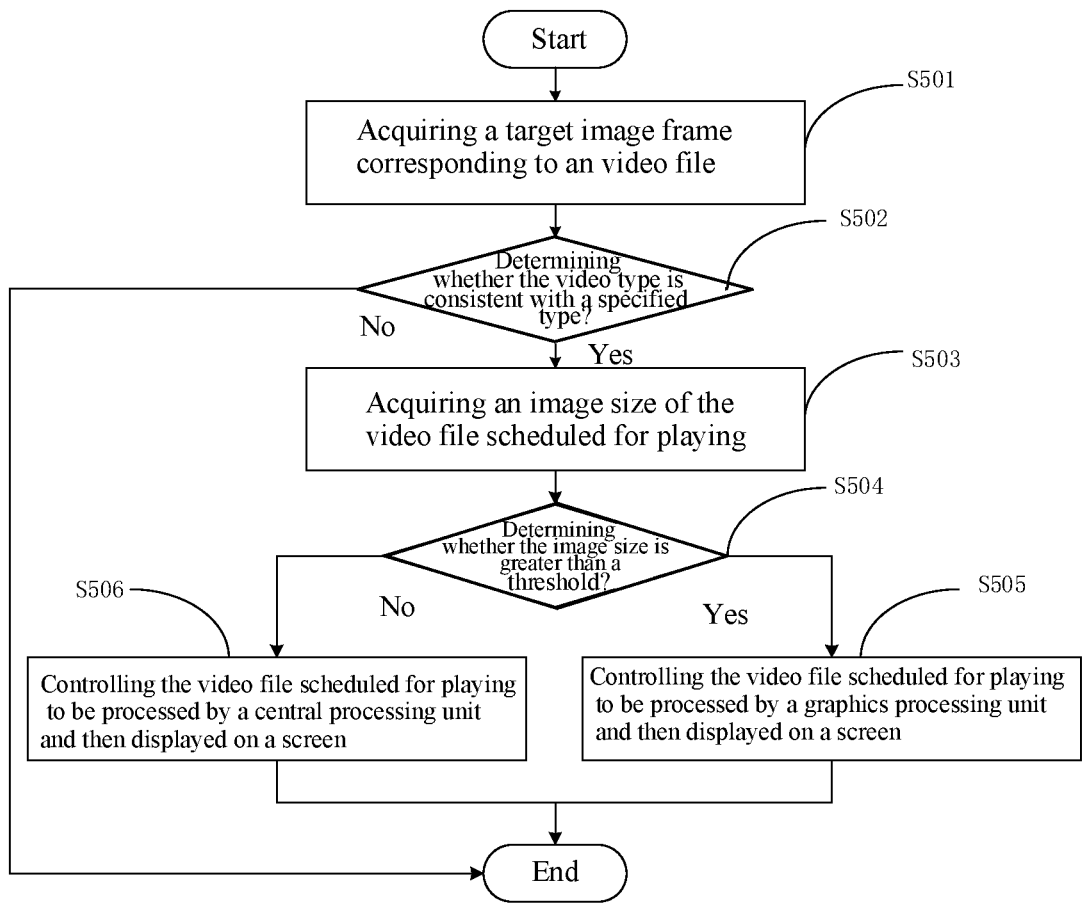
FIG. 5 is a method flowchart illustrating a video processing method provided by yet another embodiment of the present disclosure.

In addition, considering that some video files satisfy conditions of the above-mentioned specified types, but their images are relatively small. When the central processing unit is used for processing, it will not cause too much burden on the central processing unit, so the graphics processing unit is not necessarily used. Thus, it can be determined whether the graphics processing unit is used for processing by combining the image size. Specifically, please refer to FIG. 5, which shows a video processing method provided by an embodiment of the present disclosure. The method includes S501 to S506.

S501: acquiring a video type of a video file scheduled for playing.

S502: determining whether the video type is consistent with a specified type.

S503: acquiring an image size of the video file scheduled for playing.

The image size of the video file scheduled for playing can include an image-data size and an image dimension. The image-data size is recorded as a data size of the specified image frame of the video file, that is, the size of a storing space occupied by the specified image frame. For example, if the size of the specified image frame is 1M, the image-data size is 1M. The data size of the specified image frame can be an arithmetic value of the data size of all the image frames of the video file scheduled for playing, wherein the arithmetic value can be an average value, a minimum value, or a maximum value. In addition, the data size of the specified image frame can be the data size of the first image frame of the video file scheduled for playing. Furthermore, the data size of the specified image frame can be an average value, a minimum value, or a maximum value of data size of all key image frames of the video file scheduled for playing. In addition, considering that the video file scheduled for playing may be an online video file, the data size of the specified image frame of the video file scheduled for playing may be an arithmetic value of the data size of all image frames of the video file scheduled for playing that is currently played.

The image size may be a physical resolution of the video file scheduled for playing, that is, an image resolution of the video file scheduled for playing.

S504: determining whether the image size is greater than a threshold.

If the image size is the image-data size, a specific implementation for determining whether the image size is greater than the threshold is to determine whether the image-data size is greater than the threshold. If the image-data size is greater than the threshold, it is determined that the image size satisfies a specified condition, and procedure S505 is executed. If the image-data size is less than or equal to the threshold, it is determined that the image size does not satisfy the specified condition, and procedure S505 is not executed. The threshold can be set according to specific usage requirements and will not be repeated here.

If the image size is an image dimension, a specific implementation for determining whether the image size satisfies the specified condition is to determine whether the image size is larger than a specified image dimension. If being greater than the image dimension, it is determined that the image size satisfies the specified condition, and procedure S505 is executed. If the image size is less than or equal to the image dimension, it is determined that the image size does not satisfy the specified condition, and procedure S505 is not executed.

The specified image dimension can be set according to actual usage. For example, the image dimension can be a resolution of 1280×720. If the image dimension of the video file scheduled for playing is greater than the resolution of 1280×720, it is determined that the image size satisfies the specified condition, and procedure S505 is executed. If the image dimension of the video file scheduled for playing is less than or equal to the resolution of 1280×720, it is determined that the image size does not satisfy the specified condition, and procedure S505 is not executed.

S505: controlling the video file scheduled for playing to be processed by the graphics processing unit and then displayed on the screen.

When the graphics processing unit processes larger video files, the advantages of processing are more obvious, that is, a processing speed is significantly improved by comparing with the central processing unit. For video files with larger image data or video files with larger image sizes, using the graphics processing unit for processing is more reasonable.

S506: controlling the video file scheduled for playing to be processed by the central processing unit and then displayed on the screen.

A specific implementation for the video file scheduled for playing to be processed by the central processing unit and then displayed on the screen may be that the CPU is used to decode the video, and then call the GPU to render and synthesize the video to display on the screen after decoding. On-screen rendering or off-screen rendering can be used to render and synthesize the data of image frames that is obtained after the CPU performs decoding and then display the video file scheduled for playing on the screen.

Hence, when the video type of the video file scheduled for playing is the specified type but the image size does not satisfy the specified condition, the video file scheduled for playing is controlled to be processed by the central processing unit and then displayed on the screen, that is, the video file scheduled for playing is processed by using the central processing unit and then displayed on the screen.

Figure 6:
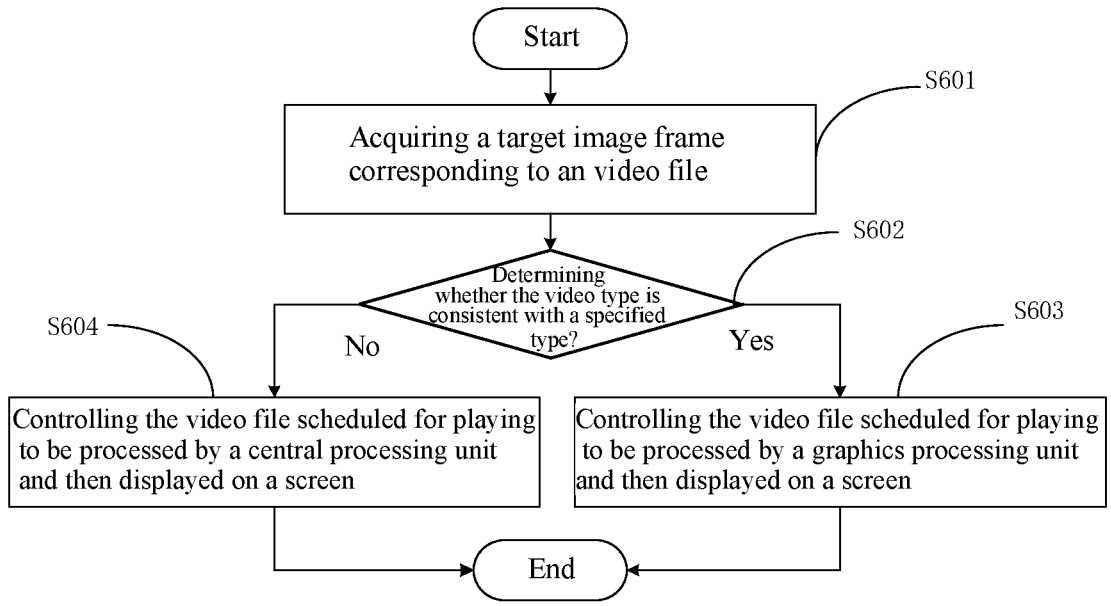
FIG. 6 is a method flowchart illustrating a video processing method provided by still another embodiment of the present disclosure.

When the video type of the video file scheduled for playing is not the specified type, the processor can be freely selected for processing. As an implementation, considering that when the type of the video file scheduled for playing is not the specified type, the urgency of selecting a graphics processing unit to process the video file is not too high. In view of the consideration of reducing the memory occupied by the graphics processing unit, when the video type of the video file scheduled for playing is not the specified type, the video file scheduled for playing is controlled to be processed by the central processing unit and then displayed on the screen. Specifically, please refer to FIG. 6, which shows a method flowchart of a video processing method provided by an embodiment of the present disclosure. The method includes S601 to S604.

S601: acquiring a video type of a video file scheduled for playing.

S602: determining whether the video type is consistent with a specified type.

S603: controlling the video file scheduled for playing to be processed by the graphics processing unit and then displayed on the screen.

S604: controlling the video file scheduled for playing to be processed by the central processing unit and then displayed on the screen.

If the video type is the specified type, control the video file scheduled for playing to be processed by the graphics processing unit and then displayed on the screen. If the video type is not the specified type, control the video file scheduled for playing to be processed by the central processing unit and then displayed on the screen. Specifically, controlling the video file scheduled for playing to be processed by the graphics processing unit and then displayed on the screen or controlling the video file scheduled for playing to be processed by the central processing unit and then displayed on the screen can refer to the above-mentioned embodiments, which will not be described here again.

In addition, considering that when using the central processing unit to play video files, in addition to processing the video files, the central processing unit also needs to execute other operation instructions of other electronic devices. if each application occupies certain resources of the central processing unit, that is, the CPU utilization rate is occupied, it may cause the current load of the CPU is too high, which is not suitable for processing video files. Specifically, if the video type is not the specified type, an implementation for controlling the video file scheduled for playing to be processed by the central processing unit and then displayed on the screen may be: if the video type is not the specified type, then acquiring a utilization rate of the central processing unit, determine whether the utilization rate of the central processing unit is less than a utilization-rate threshold; if the utilization rate of the central processing unit is less than the utilization-rate threshold, controlling the video file scheduled for playing to be processed by the central processing unit and then displayed on the screen; if the utilization rate of the central processing unit is greater than or equal to the utilization-rate threshold, control the video file scheduled for playing to be processed by the graphics processing unit and then displayed on the screen.

Specifically, the CPU utilization rate can be obtained by viewing a task manager of the electronic device. For example, in the Android system, the CPU utilization rate can be obtained through an "adb shell top" command. The utilization-rate threshold can be a utilization rate set by the user. For example, the utilization-rate threshold can be 60%. Assuming that the current utilization rate of the CPU is 40%, since 40% is less than 60%, then it is determined that the utilization rate of the central processing unit is less than the utilization-rate threshold. If the current utilization rate of the CPU is 70%, since 70% is greater than 60%, then it is determined that the utilization rate of the central processing unit is greater than the utilization-rate threshold.

If the utilization rate of the central processing unit is less than the utilization-rate threshold, it means that the current resources of the CPU are relatively rich, and the CPU can be used to process the video file scheduled for playing. If the utilization rate of the central processing unit is greater than or equal to the utilization-rate threshold, it means that the current resources of the CPU are relatively poor, the CPU can not be used to process the video file scheduled for playing.

In addition, since the utilization rate of the CPU is a sum of the utilization rate of the currently launched applications, the utilization rate of each currently launched application can be obtained, and it can be determined whether there is an application matching to a preset application among applications that are currently launched. The preset application is an application that allows the system to close the application without the user's authorization. If the application matching to the preset application among applications currently launched exists, the application matching the preset application is closed, and then the current utilization rate of the CPU is obtained as the utilization rate of the CPU, and return to execute an operation of determining whether the utilization rate of the central processing unit is less than the utilization-rate threshold.

Specifically, a list of preset applications is pre-stored in the electronic device, wherein the list of preset applications includes identifiers of specified applications. The specified application is an application authorized by the user that allows the system to close the application without the user's authorization. Specifically, the user may manually input the identifier of the specified application.

The application corresponding to each process in the current system processes and the utilization rate of the CPU of each process are scanned, and the current utilization rate of the CPU is acquired. The application matching the preset application is found among all scanned applications as an application to be processed. The application to be processed is closed and a process corresponding to the application to be processed is killed. After the process corresponding to the application to be processed is killed, the utilization rate of the CPU is acquired as an updated utilization rate. The updated utilization rate is served as a new utilization rate of the CPU to determine whether the new utilization rate is less than the utilization-rate threshold. If the new utilization rate is less than the utilization-rate threshold, the video file scheduled for playing is controlled to be processed by the central processing unit and then displayed on the screen. If the new utilization rate is greater than or equal to the utilization-rate threshold, the video file scheduled for playing is controlled to be processed by the graphics processing unit and then displayed on the screen.

Hence, in the case of a high utilization rate of the CPU, the system will be allowed to kill the process of the application that is closed without the user's authorization, thereby releasing a certain amount of resources of the CPU. At this moment, if the utilization rate of the CPU is less than the utilization-rate threshold, the central processing unit is used to process the video; if the utilization rate of the CPU is still greater than or equal to the utilization-rate threshold, the graphics processing unit is used to process the video.

Figure 7:
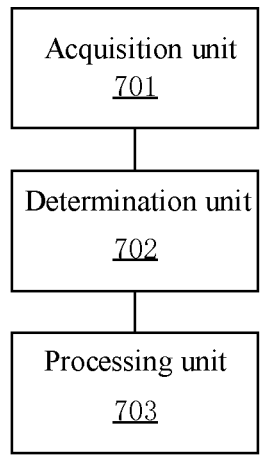
FIG. 7 is a modular block diagram illustrating a video processing apparatus provided by an embodiment of the present disclosure.

Please refer to FIG. 7, which shows a structural block diagram of a video processing apparatus provided by an embodiment of the present disclosure. The video processing apparatus 700 includes an acquisition unit 701, a determination unit 702, and a processing unit 703.

The acquisition unit 701 is used to acquire a video type of a video file scheduled for playing.

The determination unit 702 is used to determine whether the video type is consistent with a specified type.

The processing unit 703 is used to control the video file scheduled for playing to be processed by the graphics processing unit and then displayed on the screen, if the video type is the specified type.

Those skilled in the art can clearly understand that, for the convenience and conciseness of the description, the specific working process of the device and module described above can refer to the corresponding process in the above-mentioned method embodiment, which will not be repeated here.

Figure 8:
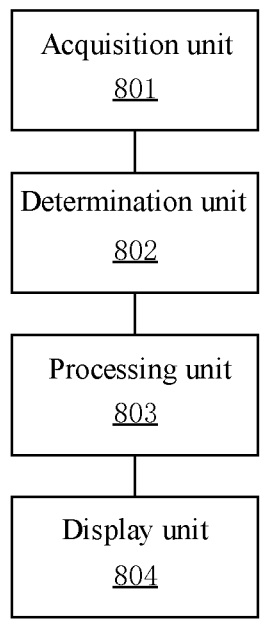
FIG. 8 is a modular block diagram illustrating a video processing apparatus provided by another embodiment of the present disclosure.

Please refer to FIG. 8, which shows a structural block diagram of a video processing apparatus provided by an embodiment of the present disclosure. The video processing apparatus 800 includes an acquisition unit 801, a determination unit 802, a processing unit 803, and a display unit 804.

The acquisition unit 801 is used to acquire a video type of a video file scheduled for playing.

The determination unit 802 is used to determine whether the video type is consistent with a specified type.

Specifically, the determination unit 802 is further used to determine the real-time level of the video file scheduled for playing according to the video type; determine whether the real-time level is higher than the specified level; it is determined that the video type is the specified type, if the real-time level is higher than the specified level; it is determined that the video type is not the specified type, if the real-time level is lower than or equal to the specified level.

The processing unit 803 is used to control the video file scheduled for playing to be processed by the graphics processing unit and then displayed on the screen, if the video type is the specified type.

Specifically, the processing unit 803 is further used to acquire the image size of the video file scheduled for playing; determine whether the image size is greater than the threshold; if the image size is greater than the threshold, control the video file scheduled for playing to be processed by the graphics processing unit and then displayed on the screen.

Furthermore, the processing unit 803 is further used to control the video file scheduled for playing to be processed by the central processing unit and then displayed on the screen if the image size is not greater than the threshold.

Moreover, the processing unit 803 is also used to determine whether the image resolution is greater than the specified resolution; if the image resolution is greater than the specified resolution, it is determined that the image size is greater than the threshold; if the image size is less than or equal to the specified image resolution, it is determined that the image size is less than or equal to the specified condition.

The display unit 804 is used to control the video file scheduled for playing to be processed by the central processing unit and then displayed on the screen, if the video type is not the specified type.

Specifically, the display unit 804 is further used to acquire the utilization rate of the central processing unit if the video type is not a specified type; determine whether the utilization rate of the central processing unit is less than the specified value; if the utilization rate of the central processing unit is less than the specified value, the video file scheduled for playing is controlled to be processed by the central processing unit and then displayed on the screen; if the utilization rate of the central processing unit is greater than or equal to the specified value, the video file scheduled for playing is controlled to be processed by the graphics processing unit and then displayed on the screen.

Those skilled in the art can clearly understand that, for the convenience and conciseness of description, the specific working process of the device and module described above can refer to the corresponding process in the above-mentioned method embodiment, which will not be repeated here.

In the several embodiments provided in the present disclosure, a coupling between the modules may be electrical, mechanical, or other forms of coupling.

In addition, each functional module in each embodiment of the present disclosure may be integrated into one processing module, or each module may exist alone physically, or two or more modules may be integrated into one module. The above-mentioned integrated modules can be implemented in the form of hardware or software functional modules.

Figure 9:
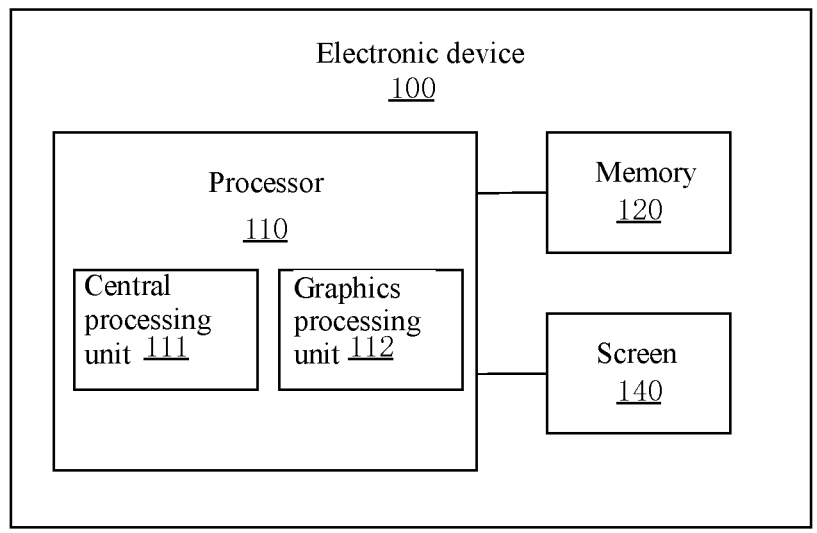
FIG. 9 is a structural block diagram illustrating an electronic device provided by an embodiment of the present disclosure.

Please refer to FIG. 9, which shows a structural block diagram of an electronic device provided by an embodiment of the present disclosure. The electronic device 100 may be an electronic device capable of running a client, such as a smartphone, a tablet computer, or an e-book. The electronic device 100 in the present disclosure may include one or more of following components: a processor 110, a memory 120, a screen 140, and one or more clients, wherein the one or more clients may be stored in the memory 120 and be configured to be executed by one or more processors 110, one or more programs are configured to execute the methods described in the above-mentioned method embodiments.

The processor 110 may include one or more processing cores. The processor 110 uses various interfaces and wiring to connect various parts of the entire electronic device 100. Various functions and processing data of the electronic device 100 are executed by running or executing instructions, programs, code sets, or instruction sets stored in the memory 120 and calling data stored in the memory 120. Optionally, the processor 110 may be implemented by using at least one hardware form of digital signal processing (DSP), field-programmable gate array (FPGA), and programmable logic array (PLA).

Specifically, the processor 110 may include one or a combination of several of a central processing unit (CPU) 111, an image processing unit (GPU) 112, a modem, and the like. The CPU mainly handles an operating system, user interface, and a client. The GPU is used to render and draw display content. The modem is used to handle wireless communication. It can be understood that the above-mentioned modem may not be integrated into the processor 110, but be implemented by a communication chip alone.

The memory 120 may include a random access memory (RAM), and may also include a read-only memory. The memory 120 can be used to store instructions, programs, codes, code sets or instruction sets. The memory 120 may include a program storage area and a data storage area, wherein the program storage area may store instructions for implementing the operating system and instructions for implementing at least one function (such as touch function, sound playback function, and image playback function), Instructions used to implement various method embodiments as following. The data storage area can also store data created by the electronic device 100 during use (such as phone book, data of audio and video, and chat record data), and the like.

The screen 120 is used to display information input by the user, information provided to the user, and various graphical user interfaces of the electronic device. These graphical user interfaces can be composed of graphics, text, icons, numbers, videos, and any combination thereof. In an example, a touch screen may be provided on a display panel so as to form a whole structure with the display panel.

Figure 10:
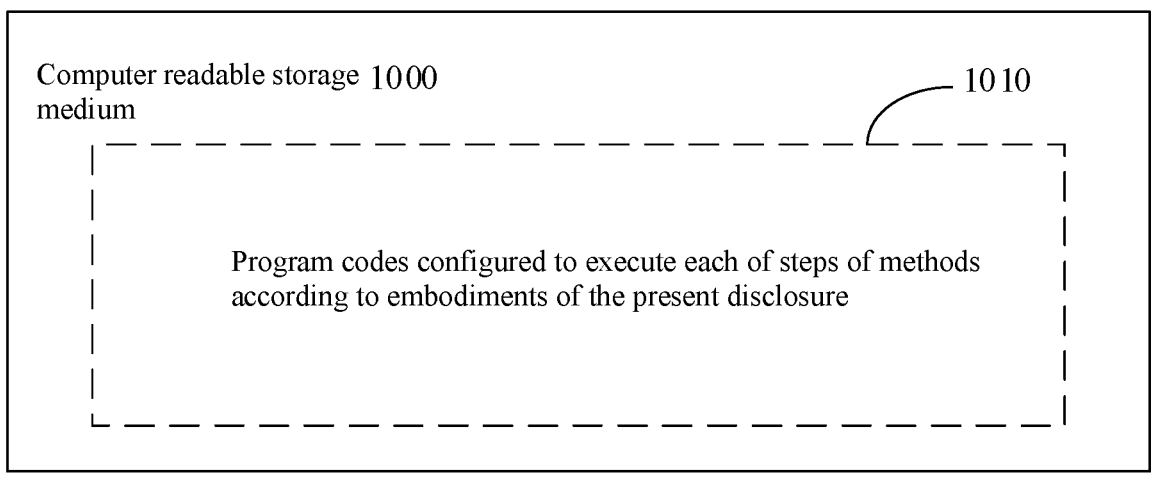
FIG. 10 illustrates a storage unit of the present disclosure configured to store or carry program codes implementing a video processing method according to an embodiment of the present disclosure.

Please refer to FIG. 10, which shows a structural block diagram of a computer-readable storage medium provided by an embodiment of the present disclosure. The computer-readable storage medium 1000 stores program codes, wherein the program codes can be called by a processor to execute the method described in the above-mentioned method embodiments.

The computer-readable storage medium 1000 may be electronic storage, such as flash memory, electrically erasable programmable read-only memory (EEPROM), EPROM, hard disk, or ROM. Optionally, the computer-readable storage medium 1000 includes a non-transitory computer-readable storage medium. The computer-readable storage medium 1000 has a storing space for the program codes 1010 executing any procedure in the above methods. These program codes can be read from or written into one or more computer program products. The program codes 1010 may, for example, be compressed, in an appropriate form.

Finally, it should be noted that the above embodiments are only used to illustrate the technical solutions of the present disclosure, and are not limited thereto. Although the above-mentioned embodiments have been described in detail with reference to the above-mentioned embodiments, those skilled in the art should understand that the technical solutions recorded in the above-mentioned embodiments can be modified, or some of the technical features can be equivalently replaced; these modifications or replacements do not drive the essence of the corresponding technical solutions to deviate from the spirit and scope of the technical solutions of the embodiments of the present disclosure.

What is claimed is:

1. A video processing method, for an electronic device, the electronic device comprising a central processing unit, a screen and a graphics processing unit, and the method executed by the central processing unit comprising:
   acquiring a video type of a video file scheduled for playing;
   determining whether the video type is consistent with a specified type;
   in response to the video type consistent with the specified type, controlling the graphics processing unit to process the video file scheduled for playing and to display the video file scheduled for playing on the screen; and
   in response to the video type not consistent with the specified type, controlling the central processing unit to process the video file scheduled for playing and to display the video file scheduled for playing on the screen, comprising:
      acquiring a utilization rate of the central processing unit in response to the video type not consistent with the specified type;

determining whether the utilization rate of the central processing unit is less than a utilization-rate threshold;

in response to the utilization rate of the central processing unit less than a utilization-rate threshold, controlling the central processing unit to process the video file scheduled for playing and to display the video file scheduled for playing on the screen; and in response to the utilization rate of the central processing unit greater than or equal to the utilization-rate threshold, controlling the graphics processing unit to process the video file scheduled for playing and to display the video file scheduled for playing on the screen.

2. The video processing method according to claim 1, wherein the determining whether the video type is consistent with a specified type comprises:

determining the video type being the specified type in response to a resolution of the video file scheduled for playing consistent with a specified resolution; and determining the video type being not the specified type in response to the resolution of the video file scheduled for playing not consistent with the specified resolution.

3. The video processing method according to claim 1, wherein the determining whether the video type is consistent with a specified type comprises:

determining the video type being the specified type in response to the video type of the video file scheduled for playing being an online video; and determining the video type being not the specified type in response to the video type of the video file scheduled for playing being not the online video.

4. The video processing method according to claim 1, wherein the determining whether the video type is consistent with a specified type comprises:

determining a real-time level of the video file scheduled for playing according to the video type;

determining the video type being consistent with the specified type in response to the real-time level higher than a specified level; and determining the video type being not consistent with the specified type in response to the real-time level less than or equal to the specified level.

5. The video processing method according to claim 4, wherein the determining a real-time level of the video file scheduled for playing according to the video type comprises:

determining the real-time level of the video file scheduled for playing according to a category of an application corresponding to the video file scheduled for playing.

6. The video processing method according to claim 5, wherein the determining the real-time level of the video file scheduled for playing according to a category of an application corresponding to the video file scheduled for playing comprises:

determining an identifier of the application corresponding to the video file scheduled for playing; and determining the real-time level of the video file scheduled for playing according to the identifier of the application.

7. The video processing method according to claim 5, wherein the determining the real-time level of the video file scheduled for playing according to a category of an application corresponding to the video file scheduled for playing comprises:

acquiring operation-behavioral data of all users having installed the application corresponding to the video file scheduled for playing within a preset period, wherein the operation-behavioral data comprises titles and time of audio files having been played, and titles and time of video files having been played by the application;

determining a quantity of the audio files having been played by the application, total playing time of the audio files having been played by the application, a quantity of the video files having been played by the application and total playing time of the video files having been played by the application, within the preset period, according to the operation-behavioral data;

acquiring a proportion of the total playing time of the audio files within the preset period as a proportion of audio playback, and acquiring a proportion of the total playing time of the video files within the preset period as a proportion of video playback; and determining the category of the application according to the proportion of audio playback and the proportion of video playback.

8. The video processing method according to claim 7, wherein the acquiring operation-behavioral data of all users having installed the application corresponding to the video file scheduled for playing within a preset period comprises:

sending an operation-behavioral query request for the application to a server corresponding to the application; and acquiring the operation-behavioral data of all users of the application, returned by the server, within the preset period.

9. The video processing method according to claim 7, wherein the determining the category of the application according to the proportion of audio playback and the proportion of video playback comprises:

setting the category of the application being a video type in response to the proportion of video playback greater than the proportion of audio playback; and setting the category of the application being an audio type in response to the proportion of audio playback greater than the proportion of video playback.

10. The video processing method according to claim 1, wherein the in response to the video type consistent with the specified type, controlling the graphics processing unit to process the video file scheduled for playing and to display the video file scheduled for playing on the screen comprises:

acquiring an image size of the video file scheduled for playing in response to the video type consistent with the specified type;

determining whether the image size is greater than a threshold; and in response to the image size greater than the threshold, controlling the graphics processing unit to process the video file scheduled for playing and to display the video file scheduled for playing on the screen.

11. The video processing method according to claim 10, further comprising:

in response to the image size less than or equal to the threshold, controlling the central processing unit to process the video file scheduled for playing and to display the video file scheduled for playing on the screen.

12. The video processing method according to claim 10, wherein the image size comprises an image-data size, wherein the determining whether the image size is greater than a threshold comprises:

determining the image size being greater than the threshold in response to the image-data size greater than the threshold; and determining the image size being less than or equal to the threshold in response to the image-data size less than or equal to the threshold.

13. The video processing method according to claim 10, wherein the image size comprises an image resolution, wherein the determining whether the image size is greater than a threshold comprises:
determining the image size being greater than the threshold in response to the image resolution greater than a specified resolution; and
determining the image size being less than or equal to the threshold in response to the image resolution less than or equal to the specified resolution.

14. The video processing method according to claim 1, wherein the in response to the video type not consistent with the specified type, controlling the central processing unit to process the video file scheduled for playing and to display the video file scheduled for playing on the screen further comprises:
in response to the utilization rate of the central processing unit less than the utilization-rate threshold and determining an application currently launched matching a preset application, closing the application currently launched matching the preset application, wherein the preset application is configured to be closed by a system without a user's authorization; and
acquiring a current utilization rate of the central processing unit as the utilization rate of the central processing unit, and returning to execute the determining whether the utilization rate of the central processing unit is less than the utilization-rate threshold.

15. The video processing method according to claim 11, wherein the controlling the central processing unit to process the video file scheduled for playing and to display the video file scheduled for playing on the screen comprises:
controlling the central processing unit to decode the video file scheduled for playing, and obtaining a plurality of decoded video frames; and
calling the graphics processing unit to render and synthesize the video frames and to display the video frames on the screen.

16. An electronic device, comprising:
a central processing unit and a graphics processing unit;
a memory;
a screen; and
one or more applications stored in the memory and configured to be executed by the central processing unit, wherein the one or more applications are configured to execute a method comprising:
acquiring a video type of a video file scheduled for playing;
determining whether the video type is consistent with a specified type;
in response to the video type consistent with the specified type, controlling the graphics processing unit to process the video file scheduled for playing and to display the video file scheduled for playing on the screen; and
in response to the video type not consistent with the specified type, controlling the central processing unit to process the video file scheduled for playing and to display the video file scheduled for playing on the screen, comprising:
acquiring a utilization rate of the central processing unit in response to the video type not consistent with the specified type;
in response to the utilization rate of the central processing unit less than a utilization-rate threshold, controlling the central processing unit to process the video file scheduled for playing and to display the video file scheduled for playing on the screen; and
in response to the utilization rate of the central processing unit greater than or equal to the utilization-rate threshold, controlling the graphics processing unit to process the video file scheduled for playing and to display the video file scheduled for playing on the screen.

17. The electronic device according to claim 16, wherein the determining whether the video type is consistent with a specified type comprises:
determining the video type being the specified type in response to a resolution of the video file scheduled for playing consistent with a specified resolution; and
determining the video type being not the specified type in response to the resolution of the video file scheduled for playing not consistent with the specified resolution.

18. A non-transitory computer-readable storage medium with program codes stored thereon, wherein the program codes can be called by a processor to execute a method comprising:
acquiring a video type of a video file scheduled for playing;
determining whether the video type is consistent with a specified type;
in response to the video type consistent with the specified type, controlling a graphics processing unit to process the video file scheduled for playing and to display the video file scheduled for playing on a screen; and
in response to the video type not consistent with the specified type, controlling the central processing unit to process the video file scheduled for playing and to display the video file scheduled for playing on the screen, comprising:
acquiring a utilization rate of the central processing unit in response to the video type not consistent with the specified type;
in response to the utilization rate of the central processing unit less than a utilization-rate threshold, controlling the central processing unit to process the video file scheduled for playing and to display the video file scheduled for playing on the screen; and
in response to the utilization rate of the central processing unit greater than or equal to the utilization-rate threshold, controlling the graphics processing unit to process the video file scheduled for playing and to display the video file scheduled for playing on the screen.

* * * * *